United States Patent [19]

Duchene et al.

[11] 4,220,514

[45] Sep. 2, 1980

[54] ELECTRODE FOR AN ELECTROLYTIC CELL PARTICULARLY FOR ELECTROLYTIC DISPLAY CELLS AND PROCESS OF MANUFACTURE

[76] Inventors: Jacques Duchene, Grenoble; Robert Meyer, Gieres, both of France

[21] Appl. No.: 956,646

[22] Filed: Nov. 1, 1978

[30] Foreign Application Priority Data

Nov. 7, 1977 [FR] France ................................. 77 33383

[51] Int. Cl.² ............................................ C23C 15/00
[52] U.S. Cl. ............................... 204/192 P; 427/108; 427/126.3; 156/652; 156/656; 156/667; 204/129.65
[58] Field of Search ........ 204/192 P, 192 EC, 129.65; 427/108, 109, 110, 126; 156/652, 656, 657, 663, 667

[56] References Cited

U.S. PATENT DOCUMENTS

| | | | |
|---|---|---|---|
| 3,409,523 | 11/1968 | Garbarini | 204/143 |
| 3,507,759 | 4/1970 | Shaw | 204/143 |
| 3,928,658 | 12/1975 | van Boxtel et al. | 427/108 |
| 3,979,240 | 9/1976 | Ghezzo | 156/656 |
| 4,093,504 | 6/1978 | Ponjeé et al. | 156/656 |
| 4,113,578 | 9/1978 | Del Monte | 204/15 |

FOREIGN PATENT DOCUMENTS 757782  9/1956  United Kingdom ..................... 204/192

OTHER PUBLICATIONS

G. J. Kominak, Metallization Adhesion Layer Formed by Backscattering During Desputter Etching; J. Vac. Sci. Technol., vol. 13, No. 5, Sep./Oct. 1976, p. 1100.

*Primary Examiner*—John H. Mack
*Assistant Examiner*—William Leader
*Attorney, Agent, or Firm*—Kerkam, Stowell, Kondracki & Clarke

[57] ABSTRACT

Electrode and specifically a transparent electrode for an electrolytic cell and specifically an electrolytic display cell constituted by a transparent conducting layer having a configuration suitable for display purposes and deposited on an electrically insulating transparent support. The transparent conducting layer is coated with a thin transparent conducting film made from a material different from that of the conducting layer, so that under the operating conditions of the cell it is possible to limit the overvoltage on the electrode to such a value that there can be no secondary reactions liable to bring about a transformation of the materials forming said layer and said film. The layer is made from tin-doped indium oxide and the film from tin oxide doped with antimony or cadmium.

5 Claims, 2 Drawing Figures

ELECTRODE FOR AN ELECTROLYTIC CELL PARTICULARLY FOR ELECTROLYTIC DISPLAY CELLS AND PROCESS OF MANUFACTURE

BACKGROUND OF THE INVENTION

The present invention relates to an electrode for an electrolytic cell, particularly for electrolytic display cells.

More specifically the present invention relates to an electrode which, compared with presently known electrodes, has an improved resistance to electrochemical corrosion under the operating conditions of an electrolytic cell and specifically under the operating conditions of an electrolytic display cell.

An electrolytic display cell generally comprises an electrolyte containing metallic ions inserted between a first wall coated with an electrode comprising a transparent conductive layer which is suitable for display purposes and a second wall coated with a counter-electrode, as well as electricity supply means connected to the electrode and to the counter-electrode to bring about, by electrochemical reaction from said ions, the deposition or dissolving of a metal coating on said electrode. Thus, the display is obtained when the metal coating whose optical properties (reflection, transmission or absorption) are suitable for bringing about the formation of a mark (character, curve, segment, etc.) is deposited or dissolved on the electrode.

In cells of this type the electrode generally comprises a layer of electricity-conducting transparent material having good electrical conduction and optical transmission properties in the visible range, for example an indium oxide layer.

However, the presently known electrodes of this type have the disadvantage of an inadequate electrochemical resistance, particularly due to the appearance of parasitic secondary reactions which may occur on the electrode during the operation of the cell under the action of overvoltage phenomena. Thus, when using indium oxide transparent electrodes with a silver salt-based electrolyte the parasitic secondary reaction consisting of a reduction of the indium oxide generally occurs when the overvoltage on the electrode is above 800 mV relative to an $Ag/Ag^+$ silver electrode and leads to significant wear to the electrode after about 200 to 300 operating cycles.

To obviate this disadvantage the transparent electrodes of electrolytic display cells have been made from a material having a better resistance to electrochemical corrosion, for example tin oxide.

However the use of materials of this type leads to other disadvantages. Thus, their electrical conduction characteristics are not satisfactory, they have to be used in the form of much thicker layers which is prejudicial to the transparent qualities of the electrode and due to their corrosion resistance properties they are difficult to etch in a homogeneous manner.

BRIEF SUMMARY OF THE INVENTION

The problem of the invention is to provide an electrode for an electrolytic cell and particularly a transparent electrode for an electrolytic display cell which obviates the above disadvantages, through having an improved electrochemical resistance and at the same time good electrical conduction and optionally optical transmission properties.

The electrode for an electrolytic cell according to the invention comprises a conductive layer deposited on an electrically insulating transparent support, whereby said conductive layer, called the first layer is coated with a thin conductive layer, called the second layer made from a material differing from that of the first layer and selected in such a way that under the operating conditions of the electrolytic cell no parasitic secondary reactions can occur which are liable to degrade the said layers.

According to an advantageous feature of the invention the second layer is made from a material which, under the operating conditions of the cell, makes it possible to limit the overvoltage on the electrode to a value such that there can be no secondary reaction liable to bring about a transformation of the materials constituting said layers.

According to an embodiment of the invention more particularly suitable for an electrolytic display cell the electrode comprises a transparent conductive layer having a shape suitable for display purposes and deposited on an electrically insulating transparent support, whereby said transparent conductive layer, called the first layer is coated with a thin transparent conductive layer, called the second layer made from a material different from that of the first layer and selected in such a way that under the operating conditions of the said electrolytic display cell there can be no parasitic secondary reactions liable to degrade said layers.

The transparent electrode as defined hereinbefore in advantageous manner utilises the fact that by placing a very thin second layer made from a suitable material on the first electrically conductive transparent layer not only is the first layer insulated from the electrolyte, but during operation of the cell it is possible to reduce the overvoltage of the deposit of the substance serving for display purposes. Thus, during the operation of the electrolytic display cell the appearance of secondary reactions liable to degrade the electrode is obviated, while at the same time obtaining optical transmission and electrical conduction characteristics of the electrode which are substantially equivalent to those of the first layer.

Advantageously the first layer is an indium oxide doped with tin and the second layer a tin oxide doped with antimony or cadmium.

Preferably the respective thicknesses of the first and second layers are such that the assembly formed by the two layers has a square resistivity of 20 to 25 Ohms per square and an optical transmission of 70 to 80 %.

In the case of a first layer of indium oxide and a second layer of tin oxide doped with antimony or cadmium the thickness of the first layer is advantageously between 1,000 Å and 1μ and the thickness of the second layer is advantageously between 100 and 500 Å.

Thus, under the operating conditions of an electrolytic display cell using a silver salt as the electrolyte and as the transparent electrode an electrode comprising a first tin-doped indium oxide layer and a second antimony-doped or cadmium-doped tin oxide layer a thickness of the second layer as low as 100 Å is sufficient to reduce the electrical overvoltage created on the electrode during the operation of the cell to a value such that secondary reactions liable to degrade the electrode and in particular the reaction of reducing indium oxide into indium suboxide cannot occur.

Moreover it should be noted that an electrode of this type has electrical resistance and transparence qualities equivalent to those of the first indium oxide layer.

The invention also relates to a process for forming on an insulating support an electricity-conducting coating which can be used in particular as the electrode for an electrolytic cell.

This process comprises depositing on the electrically insulating support a first layer of an electricity-conducting material, subjecting said first layer to surface treatment to prevent the formation of an electrically insulating film on said layer and depositing on the first layer treated in this way a second layer of another electricity-conducting material.

Advantageously the surface treatment comprises subjecting the first layer to an ion bombardment in order to clean it and degas it.

In order to produce a transparent conductive coating the insulating support, the first layer and the second layer are made from transparent materials. In this case after depositing the first layer the latter undergoes an annealing treatment before depositing the second layer. Advantageously these layers are deposited by radiofrequency cathodic sputtering.

According to one embodiment of the process of the invention an optically transparent electricity-conducting coating having a given form and usable more particularly as an electrode in an electrolytic display cell is produced by successively depositing on an electrically insulating support a first electricity-conducting layer and a second layer of an electricity-conducting material which differs from the material used in the first layer, whereby successively the second layer is electrochemically etched and the first layer is chemically etched.

Advantageously the first and second layers are deposited by radiofrequency cathodic sputtering and preferably, after depositing the first layer it undergoes a surface treatment, for example by ion bombardment in order to clean it and degas it.

In the latter embodiment of the process the insulating support, the first layer and the second layer are made from transparent materials and said first layer undergoes an annealing treatment before depositing the second layer.

The latter embodiment of the process of the invention is particularly advantageous for producing on an insulating support of a covering having an outer tin oxide layer with a given configuration.

In actual fact the production of such a tin oxide layer causes certain problems because the conventional etching processes do not permit the elimination at the desired points of the tin oxide deposited in the form of a continuous layer on a support.

According to the invention this result can be obtained by electrochemical etching if a layer of an electricity-conducting material which can be etched by any means, for example chemically, is deposited on the insulating support prior to depositing a continuous layer of tin oxide.

This process for producing on an insulating support a covering having an outer tin oxide layer of given configuration consists of depositing on said electrically insulating support a first layer of an electricity-conducting material which can be removed by any means, then depositing on the first layer a second tin oxide layer, followed by successively performing electrochemical etching of the second tin oxide layer, then etching of the first layer to remove the first layer at the points where the second layer has been attacked by electrochemical etching.

BRIEF DESCRIPTION OF THE DRAWINGS

The invention is described in greater detail hereinafter relative to a non-limitative embodiment and with reference to the attached drawings, wherein show.

DETAILED DESCRIPTION OF THE PREFERRED EMBODIMENTS

Figure 1:
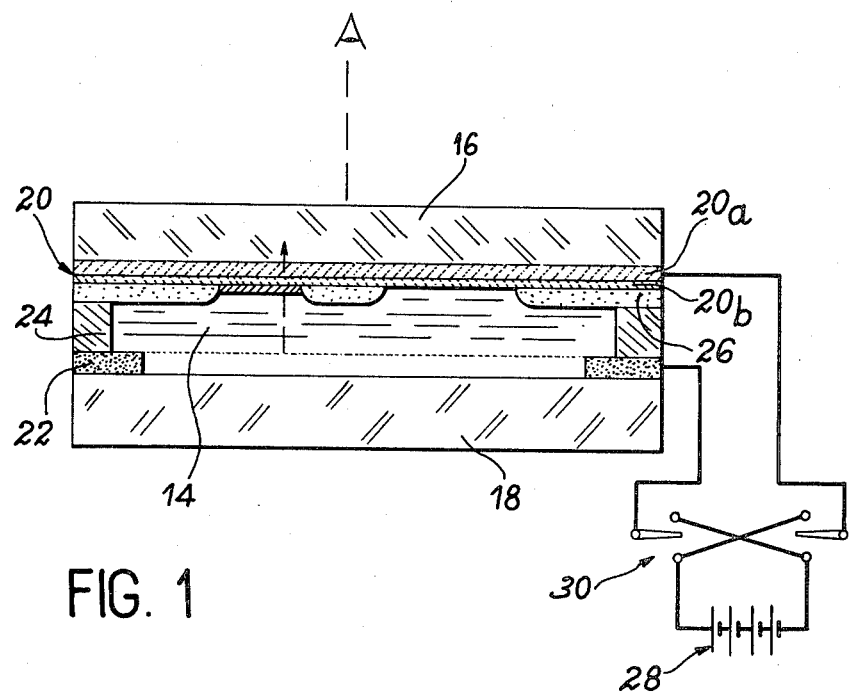
FIG. 1 a diagrammatic view of an electrolytic display cell using a transparent electrode according to the invention.

FIG. 1 shows an electrolytic display cell comprising an electrolyte 14 inserted between two walls 16 and 18 respectively covered by an electrode 20 and a counter-electrode 22, both of which are connected to a voltage source 28 by means of a switch 30 permitting the application between electrode 20 and counter-electrode 22 of a continuous potential difference in one or other direction, depending on the position of switch 30. Wedges 24 are inserted between electrode 20 and counter-electrode 22 in order to give the electrolyte an appropriate thickness, whereby an electrical insulating material 26 is placed between wedge 24 and electrode 20. According to the invention electrode 20 comprises two superimposed layers 20a and 20b, the first layer 20a in contact with wall 16 being made for example from tin-doped indium oxide and the second layer 20b in contact with electrolyte 14 being made from tin oxide doped with cadmium or antimony.

In the present embodiment layer 20a of indium oxide doped with tin has a thickness of 2,000 Å and a square resistivity of 20 Ohms per square and an optical transmission of 80 to 85%. The antimony-doped tin oxide layer 20b has a thickness of 500 Å. The assembly of the two layers forming electrode 20 of the cell has a square resistivity of 20 to 25 Ohms per square and an optical transmission of approximately 70%.

Thus, the presence of the second tin oxide layer only slightly modifies the electrical conduction and optical transmission characteristics of the first tin-doped indium oxide layer, whilst giving electrode 20 a resistance to electrochemical corrosion which is sufficient to be able to withstand, during the operation of the cell, in the presence of an electrolyte based on silver halide, such as silver bromide or iodide more than $10^7$ switching operations without the slightest sign of degradation.

During the operation of the cell a mark is displayed on the transparent electrode by connecting electrode 20 to the negative pole of the voltage source in such a way as to obtain a 50 Å silver deposit on electrode 20 formed by layers 20a and 20b, which have a configuration matched to the mark to be displayed, whereby the latter can easily be observed from the outside because the silver layer of this thickness deposited by electrolysis absorbs the light.

The displayed mark can then be erased by reversing the position of switch 30 so as to connect electrode 20 to the positive pole of the voltage source in such a way as to dissolve the silver deposit previously formed on electrode 20.

In order to make an electrode of this type a first layer of tin-doped indium oxide is deposited on a transparent support constituted for example by a glass plate and this is followed by a second layer of tin oxide doped with antimony of cadmium. The two layers are advantageously deposited by radiofrequency cathodic sputtering in an oxidising atmosphere.

After depositing the first layer the latter preferably undergoes an annealing treatment and then a surface treatment by ion bombardment, in order to perfectly degas the surface of the layer and establish equilibrium conditions before depositing the second layer.

If this surface treatment is not performed there is a danger during the deposition of the second layer, which is also performed in the presence of oxygen, of forming an insulating oxide film as a result of an uncontrolled rise in the oxygen pressure in the deposition vessel, said rise being caused by degassing of the support coated with the first layer.

Furthermore the degassing treatment by ion bombardment prevents the formation of an insulating film between the two layers deposited and thus ensures a good electrical conduction of the assembly of both layers.

Etching treatment is then performed on both layers in order to obtain a transparent electrode with a configuration suitable for display purposes.

In view of the considerable resistance of the second tin oxide layer the conventional chemical etching methods generally used for etching indium oxide layers cannot be used, because they are unable to etch the antimony-doped tin oxide layer.

The latter can in fact only be chemically dissolved by nascent hydrogen, which leads to a violent and non-homogeneous etching of the layer, which does not permit a good definition of the etched portions.

However, it is possible to etch the tin oxide layer by ion bombardment, but this method has certain disadvantages such as a relatively long etching period, e.g. about one hour for etching a thickness of a few thousandths Å, together with the use of expensive equipment leading to high electrode production costs.

Thus, according to the invention, each of these layers is successively etched by firstly electrochemically etching the second tin oxide layer and then chemically etching by a conventional method those parts of the first layer which have been exposed following the electrochemical etching of the second layer.

Figure 2:
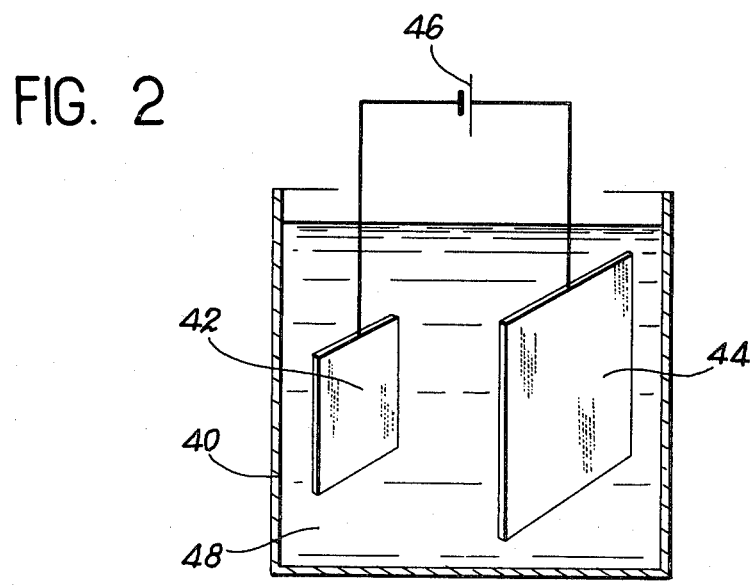
FIG. 2 a diagrammatic view of an electrochemical cell used for performing the electrochemical etching of the second layer of a transparent electrode according to the invention.

The electrochemical etching of the second layer consists of reducing the tin oxide in an acid medium under the action of a negative voltage of approximately 2 to 3 V and can for example be performed in an electrolytic cell like that shown in FIG. 2.

In said electrolytic cell cathode 42 comprises the electrode to be etched and it is positioned at a distance of a few millimeters from anode 44, made from graphite or platinum. Electrodes 42 and 44 are connected to an electricity generator 46 and immersed in an appropriate electrolyte 48 constituted by an acid solution.

It is pointed out that the etching design is defined beforehand on the electrode by conventional methods, e.g. by photolithography or silk screen printing.

The successive etching of the two layers is of particular interest because it has the advantage of both being fast and uncomplicated, whilst permitting a definition of the design comparable to that which can be achieved by ion bombardment, at least in the case of etching grooves approximately 20 to 100μ wide.

Moreover this etching method is highly suited to etching a transparent electrode having two layers of transparent electricity-conducting material because, if the electrode only had a single layer, it could not lead to a good definition of the design to be etched on the electrode.

Thus, in the latter case only the layer being etched could ensure the necessary electrical conduction for obtaining electrochemical etching. It also follows that the areas close to the current leads are etched more rapidly than the central areas and consequently overetched zones are obtained close to the current leads and unetched islands in the centre of the electrode when the latter are electrically insulated during the etching treatment.

In addition, the presence of the first indium layer on the transparent support ensures the necessary electrical conduction for electrochemical etching, leading to homogeneous etching over the complete layer.

Hereinafter a description is given in exemplified manner of the production of a transparent electrode comprising a first tin-doped indium oxide layer containing 10% tin (in atomic %) and a second antimony-doped tin oxide layer containing 20% antimony (in atom %), the thickness of the first layer being 2,000 Å and the thickness of the second layer 500 Å.

Firstly the first tin-doped indium oxide layer is deposited on the support maintained at ambient temperature in a slightly oxidising atmosphere by radiofrequency cathodic sputtering from a target constituted by indium oxide and tin so as to obtain a layer of thickness 2,500 Å.

The thus obtained layer then undergoes an annealing treatment at a temperature of 400° C. under a secondary vacuum (below $10^{-5}$ torr) for about two hours and in this way an indium oxide layer is obtained having optimum optical transmission and electrical conduction properties i.e. a transmission of 85 to 90% and a square resistance of 15 to 20 Ohms per square.

The layer then undergoes a surface treatment by ion bombardment which consists of subjecting the support covered with the first layer and heated to 400° C. to an ion bombardment for 3 to 5 minutes in a sputtering atmosphere containing 10% oxygen at a power of 500 W, resulting in a reduction in the thickness of the first layer of approximately 300 to 500 Å.

Following this treatment the second antimony-doped tin oxide layer is deposited by radiofrequency cathodic sputtering under a power of 1 kW in a sputtering atmosphere containing once again 10% oxygen for about 1½ to 2 minutes.

Under these conditions the second deposited layer has a thickness of about 500 Å and the assembly of the two layers has a square resistance of 20 to 25 Ohms per square and an optical transmission of approximately 70 %.

The support covered with the two layers then undergoes an etching treatment which has the effect of forming on the electrode 30μ wide grooves in order to form a design suitable for display.

For etching purposes a polymerisable resin is deposited on the second layer and then undergoes irradiation in accordance with the outline of the design which it is desired to obtain in order to harden the resin and thus protect the areas of the second layer which are not to be removed during the etching treatment.

After irradiation the non-hardened photopolymerisable resin is dissolved in order to expose those parts of the second layer which are to be removed by electrochemical etching.

The assembly obtained in this way is then introduced like cathode 42 into an electrochemical cell, such as that shown in FIG. 2 in which anode 44 is constituted by a platinum plate and electrolyte 48 by an aqueous hydrochloric acid solution containing 10% by volume of hydrochloric acid, whereby the distance between the electrodes is approximately 5 mm. A voltage of 2.2 V is maintained between the two electrodes for about one minute, which makes it possible to bring about the reduction of the tin oxide consituting the second layer, thus eliminating said second layer at the desired points.

The thus obtained assembly is then removed from the electrochemical cell and immersed in a phosphoric acid bath maintained at a temperature of 115° C. for 7 minutes in order to remove by chemical etching the indium oxide layer at the points where it is not covered with tin oxide.

Following this operation the hardened resin used for defining the etching grooves is dissolved in fuming nitric acid. The electrode obtained is then rinsed with water and finally methyl alcohol.

What is claimed is:

1. A process for the formation of an electricity-conducting coating with a given configuration on an electrically insulating support, wherein on said electrically insulating support are successively deposited a first layer of an electricity-conducting material consisting of indium oxide doped with tin and a second layer of another electricity-conducting material consisting of tin oxide doped with antimony or cadmium and wherein successively the second layer is electrochemically etched and the first layer is chemically etched so as to obtain a conductive coating of a given configuration.

2. A process according to claim 1, wherein the first and second layers are deposited by radiofrequency cathodic sputtering.

3. A process according to claim 1 or claim 2, wherein after depositing the first layer it undergoes a surface treatment to prevent the formation of an electrically insulating film on said first layer, the surface treatment consisting of subjecting the first layer to ion bombardment to clean and degas it before depositing the second layer.

4. A process according to claim 1, wherein after depositing the first layer it undergoes an annealing treatment before depositing the second layer.

5. A process according to claim 1, wherein the second layer is etched by electrochemical reduction in an acid medium.

* * * * *